United States Patent
Ye et al.

(10) Patent No.: US 12,406,171 B2
(45) Date of Patent: Sep. 2, 2025

(54) SYSTEM, METHOD AND STORAGE MEDIUM FOR PROCESSING PROBABILITY DISTRIBUTIONS IN NEURAL NETWORKS

(71) Applicant: Huawei Technologies Co., Ltd., Shenzhen (CN)

(72) Inventors: Zichun Ye, Toronto (CA); Peixu Ren, Toronto (CA); Xun Deng, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1133 days.

(21) Appl. No.: 17/302,745

(22) Filed: May 11, 2021

(65) Prior Publication Data

US 2022/0366222 A1    Nov. 17, 2022

(51) Int. Cl.
G06N 3/047    (2023.01)

(52) U.S. Cl.
CPC .................... *G06N 3/047* (2023.01)

(58) Field of Classification Search
CPC ...... G06N 3/047; G06N 3/045; G06N 3/0464; G06N 3/10
See application file for complete search history.

(56) References Cited

U.S. PATENT DOCUMENTS

| 2019/0034785 A1 | 1/2019 | Murray et al. |
| 2021/0103807 A1 | 4/2021 | Baker et al. |

FOREIGN PATENT DOCUMENTS

| CA | 3074675 A1 | 9/2020 |
| CN | 111711821 A | 9/2020 |
| CN | 112005250 A | 11/2020 |

OTHER PUBLICATIONS

Tran, Dustin, et al. "Simple, distributed, and accelerated probabilistic programming." Advances in Neural Information Processing Systems 31 (2018). https://proceedings.neurips.cc/paper_files/paper/2018/file/201e5bacd665709851b77148e225b332-Paper.pdf (Year: 2018).*

(Continued)

*Primary Examiner* — Kakali Chaki
*Assistant Examiner* — Michael H Hoang
(74) *Attorney, Agent, or Firm* — Slater Matsil, LLP

(57) ABSTRACT

A computer implemented method, a system and a non-transitory storage medium are provided for efficiently processing probability distributions in a neural network using a probabilistic programming language. Probability distribution data structures are provided, as well as corresponding distribution-APIs. Each probability distribution data structure comprises an identification of a distribution type and a list of parameters representative of said distribution type. The distribution data structures correspond to parametric representations of the probability distributions. The distribution data structures are inputted as distribution tensors into the layers, processed within the layer and outputted as modified tensors to downstream layers of the neural network. If needed, distribution class objects can be assembled and dissembled within the layers, but distribution tensors are still inputted or outputted by the layers, thereby limiting dataflow in between the layers of the neural network.

20 Claims, 5 Drawing Sheets

(56) References Cited

OTHER PUBLICATIONS

Gordon, Andrew D., et al. "Probabilistic programming." Future of software engineering proceedings. 2014. 167-181. https://dl.acm.org/doi/pdf/10.1145/2593882.2593900 (Year: 2014).*

TensorFlow; TensorFlow Probability is a library for probabilistic reasoning and statistical analysis.; posted on Sep. 21, 2018 by Google Inc. © [online]; available from the internet: <https://www.tensorflow.org/probability>; p. 1.

Pyro; "Pyro"; posted on Apr. 4, 2019 by PyroAi [online]; available from the internet: <https://github.com/pyro-ppl/pyro>; p. 1 to 4.

Gen; "Gen is a general-purpose probabilistic programming system, embedded in Julia."; posted on May 4, 2020 by Gen ©; available from the internet, <https://www.gen.dev/>; p. 1 and 2.

V. Dillion, Joshua, Langmore, Ian, Tran Dustin et al; "TensorFlow Distributions"; pp. 1 to 13 Google, Columbia University, Jul. 28, 2017 [Retrived on Jun. 2, 2021]; retrived from the Internet: <https://www.researchgate.net/publication/321374746_TensorFlow_Distributions>.

* cited by examiner

SYSTEM, METHOD AND STORAGE MEDIUM FOR PROCESSING PROBABILITY DISTRIBUTIONS IN NEURAL NETWORKS

TECHNICAL FIELD OF THE INVENTION

The present invention relates to the field of probabilistic programming, and more specifically relates to probabilistic programming languages in the context of neural networks.

BACKGROUND

Probability distributions are statistical functions which define the possible values and likelihood that a variable can take. A well-known probability distribution is the normal distribution (or bell curve) distribution. Other known probability distributions include the Bernoulli, binomial, uniform, Poisson, exponential and chi square distributions, as examples only.

Probabilistic programming languages (PPL) are programming languages especially adapted and designed for processing probability distributions within software applications. PPLs facilitate the inference of conclusions using statistical models applied to input data. PPLs are various, and they are typically extensions of more basic programming languages. Programming languages comprise sequences of instructions for computers to follow, so as to control their behaviour. They are used to code computer programs or applications. Software applications comprise algorithms that are written with human-understandable code lines, using a given programming language and its specific syntax and semantics, which, once compiled and transformed, can be executed by processing devices, such as computers and servers.

Different types of programming languages exist, for different types of applications: some programming languages are better adapted for web applications, others for data storage and data manipulations, and yet others for machine learning. Libraries, which are provided as part of programming language platforms (such as C++ or Python), are collections of standard programs and subroutines, data structures, objects or modules that the application algorithm can call on to perform specific or recurring functions.

PPLs are useful for interacting with machine learning frameworks, and especially with deep neural network frameworks, since deep neural networks are often required to manipulate probability distributions in their learning process. PPLs are usually in the form of domain-specific language of a deep learning frameworks, so that they can provide integration of probabilistic methods with the neural network, gradient-based inference via automatic differentiation, and scalability to large datasets and models via hardware acceleration (e.g., GPUs) and distributed computation. Examples of PPLs include Pyro, which extends from Pytorch, and Edward, which extends from TensorFlow. A neural network framework is a "skeleton" or "support" software application which provides generic functions that can be changed by additional user-written code or algorithms, to create a more specific software application, which can then be used for object recognition in images, or language translation, as examples only. TensorFlow, KERAS and TORCH are examples of well-known frameworks.

Object-oriented programming (OOP) languages are languages that rely on the concept of classes and objects. OOP languages provide reusable portions of code that share common attributes, referred to as classes. Classes are used to create "instances", called class objects (or simply "objects"), that can be stored in memory and manipulated. PPL languages currently available represent probability distribution models as classes. For example, a class is provided for a normal distribution, and another class is provided for a Bernoulli distribution. A class will typically define a group of variables, called "member variables", and a set of functions, called "member methods". Each class object, i.e., each instance of a specific distribution class, has unique values for its variables, including, for example, a mean and a standard deviation for a "normal distribution" class, and specific methods, such as log probability and entropy functions. Methods are functions that can be applied to the internal variables of the class object or to external variables. Thus, in existing PPLs, probability distributions are represented as classes, which can be instantiated as class objects, usable as both tensors and operators, regardless of what they are needed for.

Such a structure presents drawbacks when distribution class objects are simply passed in the dataflow of the network, i.e. from one layer to the next. One drawback is that frameworks must include a powerful parser which can accept class objects as inputs of the neural network. Another drawback is that passing distribution models as class objects, with both variables and methods, requires extra data in the dataflow in the neural network.

There is therefore a need to improve the way probability distributions are handled in neural networks, so as to reduce the requirements for strong parsers and dataflow.

BRIEF SUMMARY OF THE INVENTION

According to an aspect, a computer implemented method is provided, for efficiently processing probability distributions in a neural network using a probabilistic programming language (PPL). The neural network has a plurality of layers, and each layer comprises a plurality of nodes. The method comprises storing, in a data storage, a plurality of probability distribution data structures organized as distribution tensors, and corresponding distribution-Application Programming Interfaces (APIs) provided as part of the PPL. Each probability distribution data structure comprises an identification of a probability distribution type; and a list of parameters representative of said distribution type. The method comprises calling, by at least one of the plurality of nodes of a layer of the neural network, one of the distribution-APIs to retrieve from the data storage a specific one of the probability distribution data structures needed by the layer, based on the identification of the probability distribution type. The method also comprises inputting said one probability distribution data structure as a distribution tensor into the node of a layer, by storing the parameters thereof in memory. The method also comprises modifying the distribution tensor within the layer, the node comprising processor-executable instructions causing a processor to conduct probability distribution operation(s) on the stored parameters. The probability distribution operation(s) may include sampling and calculating entropy, the processor-executable instructions being written with the PPL. The method also comprises outputting, by the node of the layer, the modified distribution tensor to a node of a downstream layer of the neural network, by referencing the modified parameters in the memory, thereby limiting dataflow in between the layers of the neural network.

In possible embodiments, the method can include storing, in the data storage, a distribution library comprising a plurality of distribution functions for modifying the distribution tensors, where each function comprises specific processor-executable instructions for conducting a given probability distribution operation on the parameters.

In possible embodiments, the PPL is an object-oriented language. In this case, the distribution library is a dummy distribution class object library comprising a plurality of dummy probability distribution class objects. Each dummy distribution class object comprises a non-empty set of variables set to zero or having a null value, and a non-empty a set of methods corresponding to the distribution functions. The step of modifying the distribution tensor within the layer comprises calling the dummy probability distribution class object associated with the distribution type of the distribution data structure. Modifying the distribution tensor further comprises assembling a complete distribution class object by replacing the variables of the dummy probability distribution class object by the parameters of the distribution tensor, and temporarily storing the complete distribution class object in memory; and executing, by the processor, at least one of the methods of the complete distribution class object assembled onto the tensor parameters used as variables of the distribution class object. The complete class object is thereafter released from the memory, while keeping in memory only the modified parameters. The dummy distribution class object library thereby allows layers of the neural network to modify the complete distribution class object therein, while only receiving the distribution tensor as an input. In preferred embodiments, the methods of the dummy probability distribution class objects are method-APIs.

In possible embodiments, the methods of the dummy probability distribution class objects comprise, in addition to a sampling-method and an entropy-method, at least one of: a log likelihood method, a mean method, a variance method, a probability density method, a cumulative distribution method, a survival method, and a cross entropy method.

In possible embodiments, the method comprises a step of extracting, from the complete distribution class object generated within the layer, variables on which calculations have been conducted, the variables corresponding to the parameters of the modified tensor. The extracting step can also be referred to as a disassembling step.

In possible embodiments, the steps of assembling the complete distribution class object and of extracting therefrom the modified tensor are performed using an assembling and disassembling API.

In possible embodiments, the plurality of probability distribution data structures comprises at least one of: a normal distribution, a Bernoulli distribution, a binomial distribution, a uniform distribution, a Poisson distribution and an exponential distribution, as examples only. For example, in the case of a normal distribution data structure, the identification of the distribution type is "normal"; and the parameters representative of the distribution type comprise: mean and standard deviation.

According to another aspect, a system is also provided, for efficiently processing probability distributions in a neural network using a probabilistic programming language (PPL). The system comprises a data storage and a processing device having a processor and non-transitory memory. The data storage stores a plurality of probability distribution data structures organized as distribution tensors and corresponding distribution-Application Programming Interfaces (APIs). Each probability distribution data structure comprises an identification of a probability distribution type; and a list of parameters representative of said distribution type. The non-transitory memory has stored thereon an algorithm which causes the processor to retrieve, following a call to a distribution-API by at least one of the plurality of nodes of a layer of the neural network, from the data storage, one probability distribution data structure needed by the layer, based on the identification of the distribution type; input said one probability distribution data structure as a distribution tensor into each of the nodes of the layer, by storing the parameters thereof in memory; modify the distribution tensor within the layer, the node comprising processor-executable instructions causing a processor to conduct probability distribution operation(s) on the stored parameters, including at least one of sampling and calculating entropy, the processor-executable instructions being written with the PPL; and output, by the plurality of nodes of the layer, the modified distribution tensors to nodes of a downstream layer of the neural network, by referencing the modified parameters in the memory, thereby limiting dataflow in between the layers of the neural network.

In possible embodiments, the data storage further stores a distribution library comprising a plurality of distribution functions; and a set of function-APIs. The algorithm comprises processor-executable instructions to call one of the distribution functions from the dummy distribution library via a corresponding one of the function-APIs, the processor performing the one or more probability distribution operation(s) by executing the function on one or more of the parameters of the distribution tensor.

In possible embodiments, the distribution library is a dummy distribution class object library comprising a plurality of dummy probability distribution class objects. Each dummy distribution class object comprises a non-empty set of variables set to zero or having a null value, and non-empty a set of methods corresponding to the distribution functions. The data storage further comprises an assembling function comprising command lines to cause the processor to assemble a complete distribution class object by inputting the parameters of the distribution tensor into the dummy probability distribution class object by replacing the zero or null value of variables with the parameters of the distribution tensor; whereby the dummy distribution class object library allows layers of the neural network framework designed to process distributions as class objects to be used.

In possible embodiments, each dummy probability distribution class object comprises a set of specific method-APIs that can be executed by the processor to conduct the probability distribution operation(s) on the parameters of the tensor having a corresponding distribution type.

In possible embodiments, the specific method-APIs comprise at least one of: a log likelihood method, a mean method, a variance method, a probability density method, a cumulative distribution method, a survival method, a cross entropy method and a sampling method.

In possible embodiments, the data storage further comprises a disassembling function to extract, from the complete distribution class object, the modified tensor, for being able to pass the modified tensor to the downstream layer, the disassembling function thereafter releasing from the memory the complete class object while keeping only the modified parameters, such that only tensors are passed between layers and are provided as outputs. The assembling and disassembling functions may be provided as an assembling-and-disassembling-API.

In possible embodiments, the probability distribution data structures stored on the data storage comprise least one of: normal, Bernoulli, binomial, uniform, Poisson and exponential distribution data structures.

According to another aspect, a non-transitory storage memory is provided, comprising processor-executable instructions for efficiently processing probability distributions in a neural network using a probabilistic programming language (PPL). The processor-executable instructions causing one or more processing devices to call one of the distribution-APIs to retrieve from the data storage a specific one of the probability distribution data structures needed by the layer, based on the identification of the distribution type; input said one probability distribution data structure as a distribution tensor into a node of a layer, by storing the parameters thereof in memory; modify the distribution tensor within the layer, the node comprising processor-executable instructions causing a processor to conduct probability distribution operation(s) on the stored parameters, including for example at least one of sampling and calculating entropy, the processor-executable instructions being written with the PPL; and output, by the node of the layer, the modified distribution tensor to a node of a downstream layer of the neural network, by referencing the modified parameters in the memory, thereby limiting dataflow in between the layers of the neural network.

In possible embodiments, the processor-executable instructions cause the one or more processing devices to: call a dummy probability distribution class object associated with the distribution type indicated by the distribution tensor, the dummy distribution class object comprising variables having null values and methods corresponding to the distribution functions; assemble a complete distribution class object by to replacing the empty variables of the dummy probability distribution class object with the parameters of the tensor; apply a given one of the methods of the dummy probability distribution class object on the replaced variables; and extract, from the complete distribution class object, the modified tensor, for being able to pass the modified tensor to the downstream layer, by releasing from the memory the complete class object while keeping only the modified parameters.

The proposed method, system and non-transitory memory advantageously improve dataflow efficiency over existing technologies since the memory usage and processing capacities required to pass probability distribution as tensors instead of complete distribution class objects is greatly reduced.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
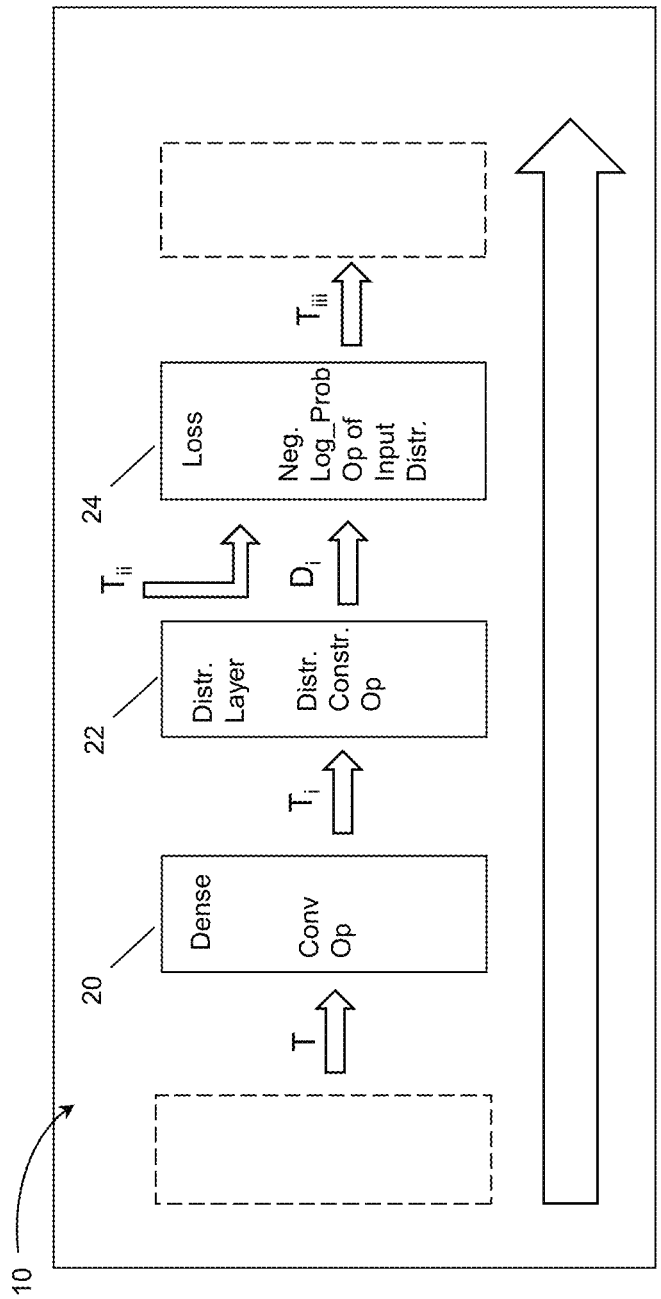
FIG. 1 is a schematic illustration of the dataflow within a neural network, using a probabilistic programming language of the prior art.

According to a general aspect, a system, a method and a non-transitory processor-readable medium are described hereafter, which provide an improved data structure for processing probability distributions in neural networks using probabilistic programming languages. The proposed system, and associated method, allow reducing the processing requirement of parsers and the dataflow in neural networks, which in turn reduces the memory and processing requirements on computers or servers used to build, train or use neural networks.

In the following description, the same numerical references refer to similar elements. The embodiments mentioned in the present description are embodiments only, given solely for exemplification purposes.

Moreover, although the embodiments of the method, system and non-transitory medium consist of certain configurations as explained and illustrated herein, not all of these configurations are essential and should not be taken in their restrictive sense. It is to be understood, as also apparent to a person skilled in the art, that other suitable components and cooperations thereinbetween, as well as other suitable configurations, may be used for processing probability distributions.

In the present description, the term system refers to a computer-implemented system which comprises different hardware components, such as databases or data storage, processing devices, routers, etc., and software components. Software components comprise software functions, including program code that, when executed, will provide the intended functionality, including for example running queries, requesting data, calling other functions, performing computations, comparing values, outputting parameters, accessing specific memory locations, etc. The software components interact with different databases or data sources to transform and output data. The different software components are further configured to communicate with other software components and peripherals of the system, for example via Application Programming Interfaces (APIs).

The term processing device encompasses computers, servers and/or specialized electronic devices configured and adapted to receive, store, process and/or transmit data. Processing devices include processors, such as microcontrollers and/or microprocessors, CPUs and GPUs, as examples only. The processors are used in combination with memory, also referred to as "storage medium." The memory can store data structures, instructions, algorithms, and rules to be processed. The term memory encompasses volatile or non-volatile/persistent memory, such as registers, cache, RAM, flash memory, ROM, as examples only. The type of memory is, of course, chosen according to the desired use, whether it should retain instructions or data, or temporarily store, retain or update data. Processing devices can interact with other peripheral devices, such as displays, graphic cards, keyboards, cameras, microphones, etc.

Broadly described, neural networks are algorithms, provided by a framework, designed to recognize patterns. A neural network typically comprises layers, which in turn comprise nodes, which are computational units akin to neurones or switches. Nodes can be triggered, and they can modify an input, by applying different operators and/or functions thereon, to produce an output. Nodes of a given layer are interconnected to nodes of neighboring layers, and weights are assigned to the connections between the nodes. The different layers represent different aspects of the data to be learned by the neural network, by minimizing an error function. Deep learning neural networks comprise several hidden layers, and involve algorithms for reinforcement learning, classification, and regression. Examples of deep neural networks include convolutional neural networks (CNNs), recurrent neural networks and recursive neural networks. In a neural network, tensors are typically provided as inputs, and operators are applied on the tensors, at each layer of the network. A tensor is an n-dimensional array. For example, a vector corresponds to a one-dimension or first-order tensor, and a matrix corresponds to a two-dimension or second-order tensor.

With regard to dataflow, this expression refers to the concept of how the data flows between layers, i.e., how data is processed and transferred from the nodes of one layer to the nodes of the next layer. Depending on the type or structure of the data being passed from one layer to the next, more or less memory and processing power is required. Operators are functions that can be applied on tensors, such as multiplying or adding them, as simple examples.

One challenge in probabilistic programming language resides in the representation of probability distributions. The data structure designed to capture this representation must be able to store the variables and parameters of the distribution, as well as the computation methods needed to derive statistical properties of the distribution, such as its log probability, covariance, and entropy, as examples only. With a proper data structure to store and process probability distributions, a programming language can provide probabilistic modelling and improved inference capacities. The parametric representation of a probability distribution thus refers to the parameters that can be extracted from probability distribution data and which characterize a given probability distribution type, such as the mean, variance, median, standard deviation, skew, as examples only. Parameters can be stored as numerical values in the memory of processing devices and organized in data structures.

When used in neural networks, probability distributions are particular, since they can be needed for their variables, or for their functions: they must thus be able to combine the roles of tensors and operators. In addition, unlike operators typically used in deep neutral networks, which have a deterministic output, when called in a graph, distributions can be used to conduct different types of computations, depending on the method called for a given probability distribution. As a result, in existing probabilistic programming languages, probability distribution models are designed as classes of the host language, and are used as class objects, including both member variables and member methods, with the parameters of the distribution being stored as variables of the class object. Thus, entire class objects are passed from one layer to the next, which requires a lot of data to be passed in the dataflow, and consequently memory usage and processing capacities, especially in deep neural networks, given the high number of hidden layers. With such a structure, the neural networks must be modified and adapted to process class objects in between layers, since frameworks are typically built to receive and send tensors at the input and output of their layers. The parser of the host language and the neural network must be adapted so as to be able to parse a class object as an input, which is not a standard ability parsers. In other words, structuring probability distributions as complete classes, which can be instantiated as class objects, require the neural networks to introduce extra functionality to accept class objects of the host language as inputs and outputs of the nodes of its layers.

Referring to FIG. 1, a schematic illustration of layers within a deep neural network 10 is shown, including layers 20, 22 and 24. This neural network is used with a PPL of the prior art, where layer 20 receives tensor T, outputs tensor Ti, and applies a convolution operation on tensor T. The tensor Ti outputted from layer 20 is fed into layer 22, which transforms Tensor Ti into a distribution Di, since the next layer 24 needs to compute its negative log probability, which requires a distribution class object as an input. Layer 24 receives as an input the distribution class object Di, and Tensor Tii, to compute the negative log probability, which is provided as a method of class object Di. Layer 24 outputs tensor Tiii, which can be fed to the next layer. Between layers 22 and 24, the distribution Di is passed as a class object, including all of its variables and methods, while only the negative log probability method is needed. Passing distribution Di as an object requires the processing device(s) hosting the neural network framework and its associated language to allocate large portions of its memory for storing this class object. In a deep neural network, this situation is amplified, given the high number of layers that need to allocate memory for object-oriented distributions, each time they are passed from one layer to another.

In order to alleviate these drawbacks, an improved system and method are proposed, wherein:
1) probability distributions are structured as simple parametric representations, referred to as "probability distribution data structures," without including any function;
2) statistical operators are made available via a distinct data structure: via functions, for non-object-oriented languages, or via dummy distribution class objects, for object-oriented languages. The functions or dummy distribution class objects can be embedded inside the nodes of the network layers or be accessed by the nodes of the layers of the networks via a distribution library; and
3) assembling and disassembling functions are provided for layers designed to process probability distributions as complete class objects. The assembling function can combine the parametric representation of the distribution with a corresponding dummy distribution class object into a complete probability distribution class object, while the dissembling function can extract the parametric abstraction of the probability distribution class object, once processed, such that only this parametric representation can be passed to the next layer, thereby reducing dataflow between layers.

A Parametric Representation of Probability Distribution Models.

According to the proposed system, a plurality of probability distribution data structures is stored in a data storage. Examples of computer data storage include hard drives, flash drives and solid-state drives. The data storage can be part of, or connected to, the computer or server executing the neural network. The probability distribution data structures are organized as distribution tensors and can be retrieved from the data storage by corresponding distribution-Application Programming Interfaces (APIs) provided as part of the PPL. The distribution-APIs are also stored in the data storage. Each probability distribution data structure represents a type of distribution and can be represented and stored in the data storage as a simple data structure vector comprising: 1) the identification of the probability distribution type, and 2) a list of parameters representing the values of the parameters of the probability distribution instance. The proposed data structure is advantageous since the processing device doesn't need to keep in memory complete class objects all the time, while the probability distribution data is passed and transformed through the different nodes and layers of the neural network. A simple data structure, having a vector or list format representing the probability distribution, is kept instead. This simple data structure can be passed through nodes of the layers as a tensor, thereby considerably reducing dataflow compared to passing complete class objects through layers.

When a given one of a layer needs to access a probability distribution, the node calls the corresponding distribution-API to retrieve from the data storage the specific probability distribution data structures needed, based on the identification of the probability distribution type. The node calls the distribution-API, meaning that the node marks its position in the instruction lines it is executing and branches off to execute a subroutine dictated by the API, which on completion returns to the position it left and continues to further execute the remaining command lines. Calling an API refers to invoking the routine or command lines of the API, by specifying the API name.

In the present case, the distribution-API call allows the node to input the probability distribution data structure as a distribution tensor into the node, by storing the parameters thereof in memory. The memory in this case is typically Random Access Memory (RAM), i.e. the memory that stores the parameters the node is actively using to conduct its computations. Inputting the probability data structure into the node require temporality storing in memory the parameters of the distribution data structure.

Each node of a layer comprises processor-executable instructions, written with the PPL, to cause the processor of a computer to conduct one or more probability distribution operation(s) on the stored parameters, so as to modify the distribution tensor within the layer. Several probability distribution operation(s) can be conducted, including for example sampling and/or calculating entropy. Sampling a probability distribution is an operation by which a smaller set of data is extracted from a complete probability distribution. Calculating entropy of a distribution can be conducted to measure the uncertainty of an outcome of a given variable of the distribution. The entropy of a random variable of a distribution is a function which attempts to characterize the "unpredictability" of the random variable. In the field of machine learning and neural networks, the Shannon entropy computation is commonly used, and is provided by: $H(x)=-\Sigma_x P(x) \cdot \log P(x)$ where $H(x)$ is the expected value of a random variable x and P is the probability distribution. Once the node as conducted one or more probability distribution operation(s) on the stored parameters, the node outputs the modified distribution tensor to the next layer, by referencing the modified parameters in the memory, thereby limiting dataflow in between the layers of the neural network. Referencing the memory means that the node provides access to the modified parameters stored in a specific location or address of the memory. In other words, the node provides a reference or an indication of the segment of the memory allocated to the modified tensor.

A Dummy Distribution Library.

Since the probability distribution data structure only contains the parametric representation of the distribution, functions are missing in the proposed data structure. The proposed system thus further stores, in the data storage, a distribution library comprising a plurality of distribution functions, and corresponding function-APIs, for modifying the distribution tensors. The neural network algorithms stored in the non-transitory memory of the computer comprises processor-executable instructions to call one of the distribution functions from the dummy distribution library via a corresponding one of the function-APIs. The processor performs the probability distribution operation(s) according to function on one or more of the parameters of the distribution tensor.

Each function comprises specific processor-executable instructions for conducting a given probability distribution operation on the parameters. The distribution functions are associated with each type of probability distribution. If the language used with the neural network is not object-oriented, dummy distribution functions are provided in a distribution library, in which the different functions can be called via APIs, referred to as function-APIs, to perform distinct statistical operations applied on a distribution of a given type. Examples of possible functions include sampling, mean, variance, covariance, entropy, cross-entropy, probability density, cumulative distribution, or survival functions, as examples only.

For object-oriented languages, i.e. when the PPL is an object-oriented language, the distribution library is a dummy distribution class object library, where the dummy distribution functions are provided as part of dummy distribution class objects, and the functions correspond to methods of the distribution class objects. The distribution library is thus a dummy distribution class object library, comprising a plurality of dummy probability distribution class objects. Each dummy distribution class object comprises a set (or collection) of variables having a null value, and a set (or collection) of methods corresponding to the distribution functions, where the sets include at least one variable and at least one method. Each dummy probability distribution class object can thus comprise specific method-APIs which can be called and executed by the processor to conduct the probability distribution operation(s) on the parameters of the tensor having a corresponding distribution type. When the PPL is object-oriented, the functions are referred to as "methods," and thus the methods of the dummy probability distribution class objects may comprise, in addition to a sampling-method and an entropy-method, at least one of: a log likelihood method (for example, provided by $l(p|x)=\log \Pi_{i-1}^n f(x_i|p)$, where x is a random variable of a probability distribution and p, a parameter of the distribution), a mean method (for example, provided by $\Sigma x P(x)$ for discrete probability distribution), a variance method (Var(x)), a probability density method (PDF), a cumulative distribution method (CDF), a survival method, and a cross entropy method (for example, provided by $(H(p,q)=-E_p [\log q)$, where q and p are two distributions), provided as examples only.

Contrary to existing PPLs, the variables of the dummy distribution class objects are empty, i.e., they have a value of zero or they are set to "null." However, if needed, a dummy distribution class object can be transformed into a full or complete distribution class object, within a node, when combined with the parametric data structure of the probability distribution, such that it can be used in layers designed to process class objects. When nodes of a layer need to manipulate distribution class objects, they can do so. In such a case, modifying the distribution tensor within the layer comprises calling, by the node, the distribution-API to load in memory the dummy probability distribution class object associated with the distribution type needed. The dummy distribution class object library allows layers of the neural network to modify the complete distribution class object therein, while only receiving the distribution tensor as an input.

Assembling and Disassembling Functions.

With the proposed system, a probability distribution can thus be represented as a class object inside the nodes of a layer, if needed. To be able to make this transformation, assembling and disassembling functions are stored in the data storage and comprises command lines to cause the processor to assemble or disassemble the distribution class object within nodes of a layer. The assembling function is provided to input the parameters of the distribution data structure to replace the empty variables of a corresponding dummy distribution class object. Assembling a complete distribution class object is performed by replacing the set of null variables of the dummy probability distribution class object by the parameters of the distribution tensor, and temporarily storing the complete distribution class object in memory, that is, for the time needed by the node to conduct probability distribution operations on the distribution class object. One or more of the methods of the complete distribution class object can be executed by the computer's processor, onto the tensor parameters used as variables of the distribution class object. The complete class object is then released, or freed, from the memory while keeping only the modified parameters.

To preserve dataflow, a disassembling function is provided, to disassemble the probability distribution class objects by extracting their variables back to a parametric data structure (usable as a tensor). In other words, variables on which calculations have been conducted are extracted, from the complete distribution class object generated within the layer, where the variables correspond to the parameters of the modified tensor. By extracting, it is meant that only the variables are kept in memory, while the methods of the class object are freed from the memory. This allows to reduce class objects to their parametric representations, so that they can be passed as tensors between nodes of the layers of the network. By calling the assembling or disassembling functions, nodes of the layers of the neural network can assemble or disassemble distribution class objects as needed.

Figure 2:
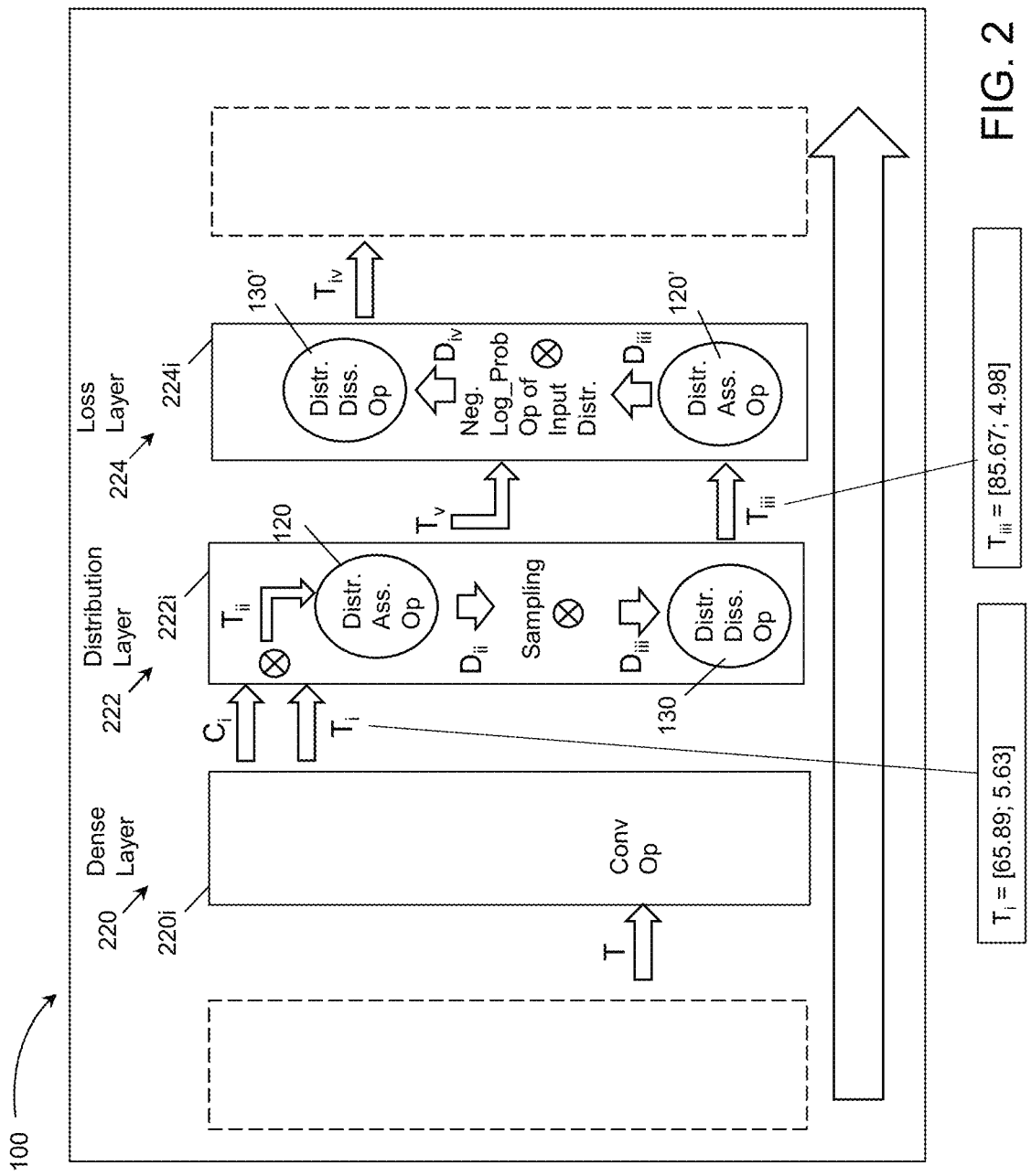
FIG. 2 is a schematic illustration of the dataflow within a neural network, using a probability distribution data structure according to a possible embodiment of the invention.

Referring to FIG. 2, a schematic illustration of layers within a deep neural network 100 is shown, including layers 220, 222 and 224. Layer 220 schematically represents a dense layer, which is a regular deeply connected neural network layer. Nodes of a deep layer receive input data, apply their activation function with a given weight and bias, and return an output. Layer 222 is a distribution layer, which requires transforming probability distribution data. Layer 224 schematically represents a loss layer, which seeks to minimize the error on the predictions made by downstream layers the neural network. In this example, the neural network is designed to work with an object-oriented language. The layers 220, 222 and 223 each comprises a plurality of nodes, where nodes 220$i$, 222$i$ and 224$i$ schematically represent one of the plurality of nodes of the corresponding layers 220, 222, 224. This neural network uses components of the proposed system 500 and method 400 (identified in FIG. 4), where a plurality distribution data structures are provided, each comprising an identification of their distribution type, such as "normal", "Bernoulli", "binomial", "uniform", "Poisson" or "exponential" distributions, and the like, and a list of parameters representative of the distribution type, such as the "mean" and the "standard deviation" for a normal distribution. The data structures representing probability distributions can thus be passed as simple tensors, identified as T, Ti, Tiii or Tiv in FIG. 2. An example of the content of a distribution tensor, Ti, is provided on FIG. 2, where the identification type is "normal", the mean is equal to 65.89, and the standard deviation is equal to 5.63. To access the probability distribution data structures, the proposed system provides distribution-APIs, each associated with a specific type of distribution data structure.

If some of the layers of the neural network 100 are designed to process probability distribution as class objects, such as layers 222 and 224 in FIG. 2, the parametric representation of normal distributions, such as tensors Ti and Tiii, must be converted into class objects to be processed by the layers. The assembling functions 120 can thus be called and used to combine the variables of the tensors Ti or Tiii, with a dummy distribution class object corresponding to the distribution type of tensors Ti or Tiii, to generate (or assemble) distribution class objects within layers 222 or 224.

Figure 3:
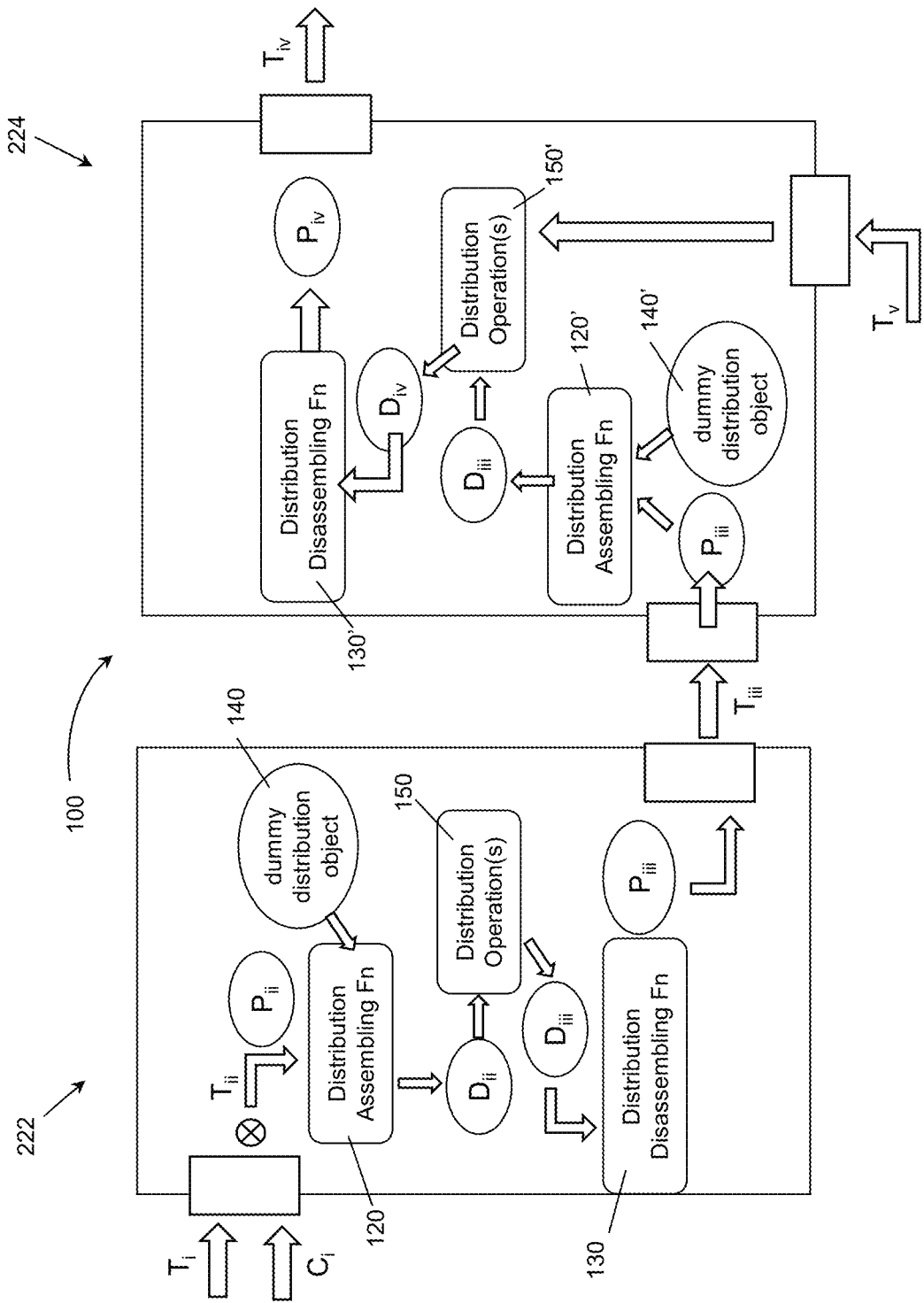
FIG. 3 is a schematic illustration of components of the proposed system for processing probability distributions in neural networks, according to an embodiment of the invention.

Still referring to FIG. 2, and also to FIG. 3, in layer 222, a constant Ci can be called to perform a computation on Ti, resulting in tensor Tii. Tii is then converted into a distribution class object Dii, using the assembling function 120, by inputting the parameters of the tensor Tii into a dummy probability distribution class object 140 (called by the assembling function 120) to replace the set of empty variables thereof. The distribution class object Dii is then processed within the layer 222, such as by applying statistical operators or functions 150 thereon. In this example, sampling is applied on the distribution class object Dii, resulting in a modified distribution class object Diii. The parameters of the distribution class object Diii can be extracted, using the disassembling function 130. The variables of distribution Diii are thus extracted from the distribution class object, and a distribution data structure is regenerated, corresponding to tensor Tiii. Tensor Tiii is outputted from layer 222 and can be in turn inputted in layer 224.

With prior art methods, the distributions represented as class objects were outputted as such, requiring the framework to allocate memory for complete objects, with both member variables and methods. In contrast, the present method and system provide a light distribution data structure (one-dimensional tensor) which can be passed between layers. The proposed method and system also allow to generate distribution class objects if needed, by providing the dummy distribution class objects and assembling/disassembling functions. In the proposed system, probability distribution data structures are reduced to lists of parameters, which can be expressed as simple vectors, reducing the requirements on dataflow. For example, a normal distribution can be represented by its mean and standard derivation only.

Figure 3A:
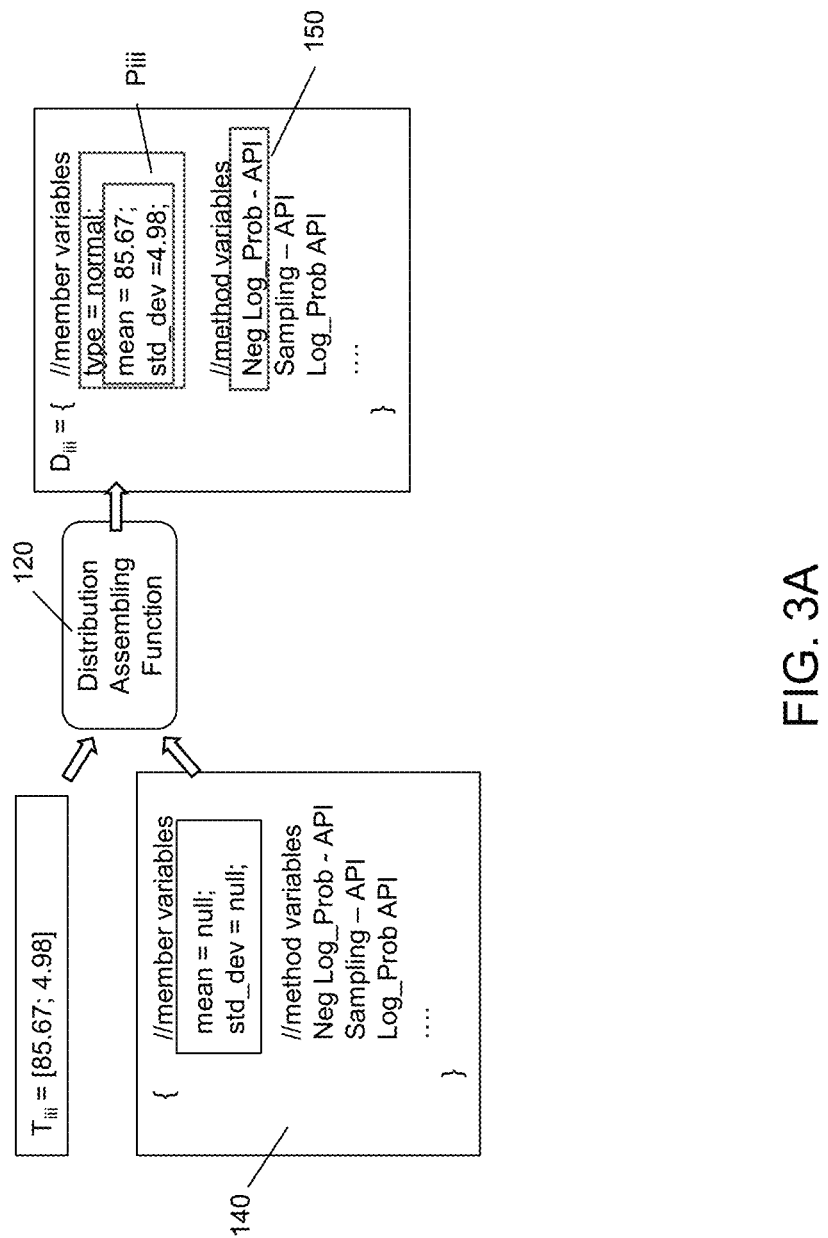
FIG. 3A is a schematic illustration of a dummy distribution class object, combined with a distribution tensor, resulting in a distribution class object, according to a possible embodiment.

Still referring to FIG. 2, and also to FIGS. 3 and 3A, at the input of layer 224, tensor Tiii is received from upstream layer 222. To cooperate with the parametric representation of this probability distribution, referenced as Piii, (representing the parameters of tensor Tiii), the system and method provides a dummy distribution class object 140', which allows layer 224 to process the distribution as an operator. The expression "dummy" is used herein since parameters of the distribution class object 140' are set to 0 (are null), and it contains only methods. It is therefore not a complete object, since its variables are set to 0 or have a null value.

In this example, as illustrated in FIG. 3A, the dummy distribution class object 140' is a dummy normal distribution class object, which includes the same methods as a typical normal distribution class object would, but its parameters, i.e., the mean and standard deviation, are uninitialized, i.e., are set to null. The dummy normal distribution class object 140' can be accessed by the neural network, by first importing and storing a distribution library. The distribution library includes different method-APIs, one for each method of each type of probability distributions. Examples of method-APIs include logarithmic probability, cumulative distribution function (CDF), negative log probability, sampling, covariance, entropy, survival, cross entropy, as examples only. The method-APIs are used by the layers to pass in the values of the tensor in runtime. The proposed system thus allows layers of the framework to perform any computation supported by the distribution library for a given distribution type, by calling the dummy distribution class object and passing the parametric representation of the distribution into a given one of its methods.

Still referring to FIGS. 3 and 3A, the system provides distribution assembling and disassembling functions, 120, 120' and 130, 130', to allow layers of the neural network to transform tensors into distribution class objects, and conversely, class objects into tensors. The assembling function 120, 120' allows inputting parameters of distribution tensors into dummy distribution class objects, 140, 140', to generate complete distribution class objects, such as Dii or Diii. The disassembling functions 130, 130' allow to disassemble distribution class objects, by extracting their member variables as parameters of distribution tensors. The assembling and disassembling functions 120, 120' 130, 130' can be provided as a universal-API, referred to hereafter as the assembling-and-disassembling API. In the example of FIGS. 3 and 3A, layer 224 calls the distribution assembling function 120' of the assembling-and-disassembling API, to input the parameters Piii of tensor Tiii (i.e., the mean=85.67 and the standard variation=4.98) into a dummy normal distribution class object 140', to create distribution class object Diii. The method-API "negative logarithmic probability) (ref. 150'), which part of the dummy normal distribution class object, can then be applied onto the variables of Diii. In some cases, the computation requires a tensor and a distribution as inputs, such as tensor Tv and Diii, to compute the negative log probability operation 150', as illustrated on the right-hand side of FIG. 3A, resulting in distribution class object Div. As a result of the computation dictated by the method-API 150', the distribution tensor Tiii has been processed within the layer 224, or in other words, a statistical operation has been applied thereon.

Still referring to FIGS. 3 and 3A, if the layer downstream of layer 224 requires a tensor as an input, layer 224 can call the disassembling function 130' of the assembling-and-disassembling API. The disassembling function 130' extracts the parameters Piv from the processed distribution, referred to as Div, and creates a corresponding distribution data structure Tiv, from the parameters Piv of the distribution class object Div. Tensor Tiv can then be passed as a tensor to the next layer. In the next layer, the process can be repeated, by calling the assembling function, which will assemble the tensor of the normal distribution and the dummy normal distribution class object. The result is a normal distribution class object, and mathematically, this newly assembled distribution is the same as the one disassembled in the last layer.

Figure 4:
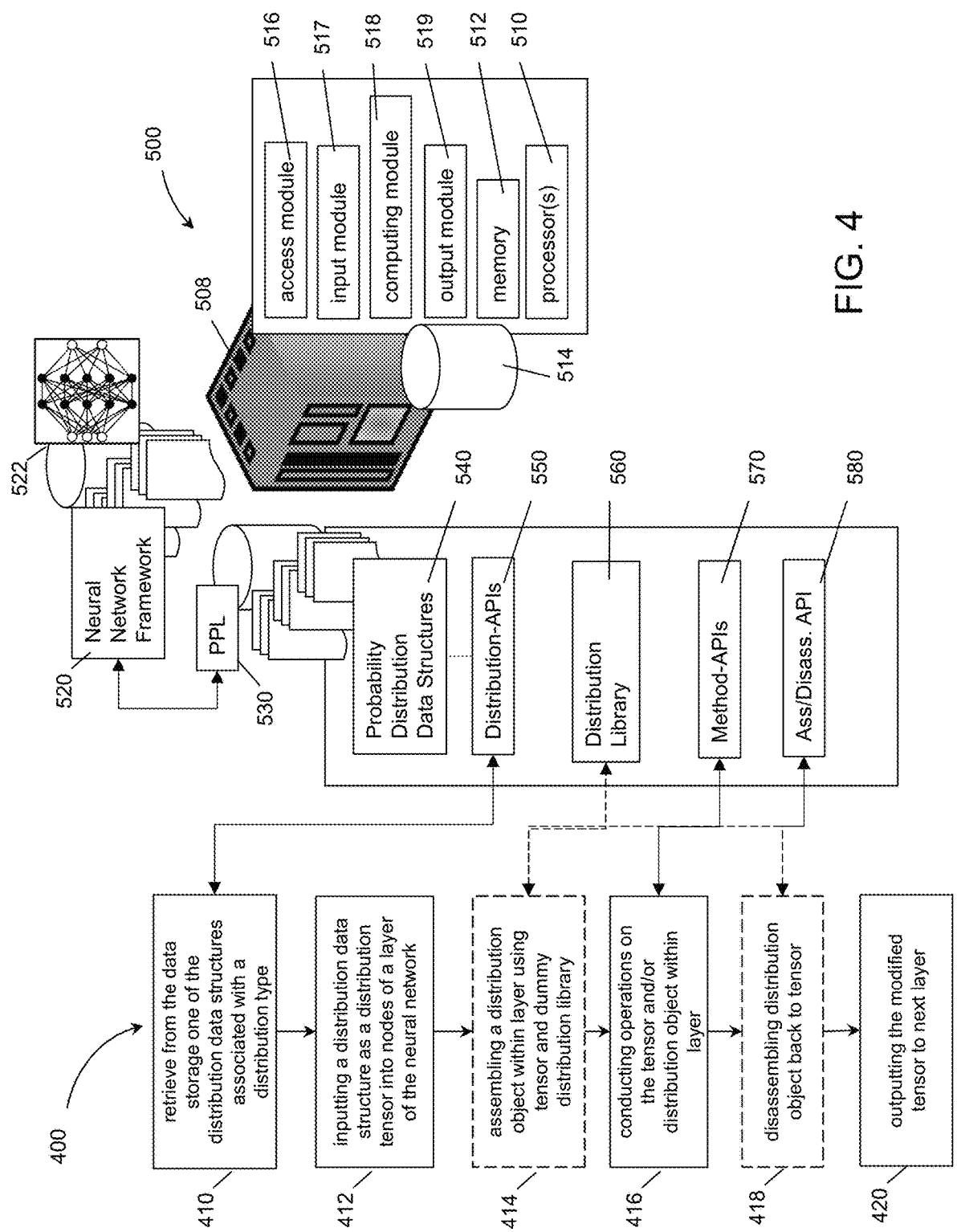
FIG. 4 shows a flow chart of the steps of the proposed method, according to a possible embodiment, and a block diagram of possible components of the system performing the steps.

Referring now to FIG. 4, a flow chart of the proposed method 400 is illustrated, along with components of the corresponding system 500. The method can be implemented by computer(s), server(s) or by any processing devices 508, so as to more efficiently process probability distributions in a neural network 522 provided by a framework 520, using a probabilistic programming language 530. The system 500 include one or more processing devices 508, which comprises processor(s) 510 and memory 512. The memory 514 includes non-transitory storage memory, to store an algorithm comprising executable instructions that can be processed by the processor(s) 510 of processing device 508, to execute steps of the proposed method. The system also stores the distribution data structures and the distribution library in a data storage, which can correspond to a portion of memory 512, or to a distinct data storage 514.

The method requires storing a set of probability distribution data structures 540 and corresponding distribution-APIs 550, each probability distribution data structure comprising, an identification of a distribution type; and a list of parameters representative said distribution type. The method also comprises a step of accessing one of the distribution data structures needed by a layer of the neural network 522, via the access module 516, by retrieving the data structure needed from the data storage, by calling the corresponding distribution-API 550. The distribution data structure 540 is then inputted, via input module 517, as a distribution tensor into said layer (step 412), by storing its parameters in the memory 512.

Optionally, for objected-oriented languages, the method can include a step of assembling a distribution class object by inputting the parameters of the tensor into a dummy probability distribution class object to replace the set of variables, as in step 414. The method comprises a step of processing, via computing module 518, the distribution tensor within the layer by performing one or more operations thereon, as per step 416, by conducting probability distribution operations thereon, such a sampling or computing entropy For languages that are not object-oriented, the processing can be performed by calling distribution functions, which can be provided via a distribution library 560. Operations on the distribution tensor can be computed as per the instructions provided by a given one of the functions. For object-oriented languages, the functions are provided as methods within dummy distribution class objects, and the dummy distribution class objects are provided by the distribution library 560, which in this case is referred to as a dummy distribution class object library. Methods of the dummy distribution class objects are called via method-APIs 570. Distribution class objects can be disassembled using the assembling-disassembling API 580 (also used for the assembling step 414), to extract, from the complete distribution class object generated within the layer, variables of the distribution class object having been processed, to obtain the modified tensor, as per step 418. The modified tensor is then outputted by the layer, at step 420, by output module 519, to the next layer of the neural network 522, thereby limiting dataflow in between the layers of the neural network framework.

The components of the system and steps of the method described above can be integrated with different probabilistic programming languages, and with different neural network framework, to support probabilistic modelling. The proposed method and system are especially useful for use with deep neural network frameworks. The proposed system can be used for example for deep neural networks which need upgrading to support distribution classes. The proposed system and method advantageously improve dataflow efficiency over existing technologies since the memory and processing capacities required to pass probability distribution as tensors instead of complete distribution class objects is greatly reduced. By passing tensors only between the layers, the data passed is purely numerical, i.e. the data flow is reduced to numbers, while prior art technologies require passing binary data of the class object in the data flow.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A computer implemented method for efficiently processing probability distributions in a neural network using a probabilistic programming language (PPL), the neural network having a plurality of layers, each layer comprising a plurality of nodes, the method comprising:
storing, in a data storage, a plurality of probability distribution data structures organized as distribution tensors, and storing corresponding distribution-Application Programming Interfaces (APIs) provided as part of the PPL, each probability distribution data structure of the plurality of probability distribution data structures comprising:
an identification of a probability distribution type, and a list of parameters representative of the probability distribution type;
calling, by a node of a layer of the neural network, one of the corresponding distribution-APIs to retrieve from the data storage a probability distribution data structure of the plurality of probability distribution data structures needed by the layer, based on the identification of the probability distribution type;
inputting the probability distribution data structure as a distribution tensor into the node of the layer, by storing parameters of the distribution tensor in a memory;
modifying the distribution tensor within the layer, the node comprising processor-executable instructions causing at least one processor to conduct at least one probability distribution operation on the stored parameters, the at least one probability distribution operation including at least one of sampling and calculating entropy, the processor-executable instructions being written with the PPL, the modifying including:
accessing a dummy probability distribution class object from a dummy distribution class object library,
assembling a complete distribution class object by combining the parameters of the distribution tensor with the dummy probability distribution class object,
executing one or more methods of the complete distribution class object to modify the parameters, and
extracting the modified parameters from the complete distribution class object into a modified distribution tensor and releasing the complete distribution class object from the memory; and
outputting, by the node of the layer, the modified distribution tensor to a downstream node of a downstream layer of the layer of the neural network, by referencing the modified parameters in the memory, thereby limiting dataflow in between the layers of the neural network.

2. The computer implemented method according to claim 1, further comprising:
storing, in the data storage, a distribution library comprising a plurality of distribution functions for modifying the distribution tensors,
each function comprising specific processor-executable instructions for conducting a given probability distribution operation on respective parameters of a corresponding distribution tensor.

3. The computer implemented method according to claim 2, wherein:
the PPL is an object-oriented language;
the distribution library is the dummy distribution class object library comprising a plurality of dummy probability distribution class objects, each dummy distribution class object comprising:
a set of variables set to zero or having a null value, and
a set of methods corresponding to the distribution functions,
the accessing comprises:
calling the dummy probability distribution class object associated with the probability distribution type of the probability distribution data structure;
the assembling comprises:
assembling the complete distribution class object by replacing the set of variables of the dummy probability distribution class object with the parameters of the distribution tensor, and temporarily storing the complete distribution class object in the memory;
the executing comprises:
executing, by the at least one processor, the one or more methods of the complete distribution class object assembled onto the parameters of the distribution tensor used as variables of the complete distribution class object, and thereafter releasing from the memory the complete distribution class object while keeping only the modified parameters; and
wherein the dummy distribution class object library allows the layers of the neural network to modify the complete distribution class object therein, while only receiving the distribution tensor as an input.

4. The computer implemented method according to claim 3, wherein the methods of the dummy probability distribution class objects are method-APIs.

5. The computer implemented method according to claim 3, wherein the methods of the dummy probability distribution class objects comprise, in addition to a sampling-method and an entropy-method, at least one of: a log likelihood method, a mean method, a variance method, a probability density method, a cumulative distribution method, a survival method, and a cross entropy method.

6. The computer implemented method according to claim 3, further comprising:
extracting, from the complete distribution class object generated within the layer, variables on which calculations have been conducted, the variables corresponding to the parameters of the modified distribution tensor.

7. The computer implemented method according to claim 6, wherein the assembling the complete distribution class object and of extracting therefrom the modified distribution tensor are performed using an assembling and disassembling API.

8. The computer implemented method according to claim 1, wherein the plurality of probability distribution data structures comprises at least one of: a normal distribution, a Bernoulli distribution, a binomial distribution, a uniform distribution, a Poisson distribution and an exponential distribution.

9. The computer implemented method according to claim 1, wherein the plurality of probability distribution data structures comprises a normal distribution data structure, wherein:
the identification of the probability distribution type is "normal"; and
the parameters representative of the probability distribution type comprise: mean and standard deviation.

10. A system for efficiently processing probability distributions in a neural network using a probabilistic programming language (PPL), the system comprising:
a data storage storing:
a plurality of probability distribution data structures organized as distribution tensors and corresponding distribution-Application Programming Interfaces (APIs) as part of the PPL;
each probability distribution data structure of the plurality of probability distribution data structures comprising:
an identification of a probability distribution type, and
a list of parameters representative of the probability distribution type;
a processing device having at least one processor and non-transitory memory having stored thereon an algorithm to cause the at least one processor to perform operations including:
calling, by a node of a layer of the neural network, one of the corresponding distribution-APIs to retrieve from the data storage a probability distribution data structure of the plurality of probability distribution data structures needed by the layer, based on the identification of the probability distribution type;
inputting the probability distribution data structure as a distribution tensor into the node of the layer, by storing parameters of the distribution tensor in a memory;
modifying the distribution tensor within the layer, the node comprising processor-executable instructions causing the at least one processor to conduct at least one probability distribution operation on the stored parameters, the at least one probability distribution operation including at least one of sampling and calculating entropy, the processor-executable instructions being written with the PPL, the modifying including:
accessing a dummy probability distribution class object from a dummy distribution class object library,
assembling a complete distribution class object by combining the parameters of the distribution tensor with the dummy probability distribution class object,
executing one or more methods of the complete distribution class object to modify the parameters, and
extracting the modified parameters from the complete distribution class object into a modified distribution tensor and releasing the complete distribution class object from the memory; and
outputting, by the node of the layer, the modified distribution tensor to a downstream node of a downstream layer of the layer of the neural network, by referencing the modified parameters stored in the memory, thereby limiting dataflow in between the layers of the neural network.

11. The system according to claim 10, wherein:
the data storage further stores:
a distribution library comprising a plurality of distribution functions for modifying the distribution tensors; and
each function comprises specific processor-executable instructions for conducting a given probability distribution operation on respective parameters of a corresponding distribution tensor.

12. The system according to claim 11, wherein:
the PPL is an object-oriented language;
the distribution library is the dummy distribution class object library comprising a plurality of dummy probability distribution class objects, each dummy distribution class object comprising:
a set of variables set to zero or having a null value, and
a set of methods corresponding to the distribution functions,
the accessing comprises:
calling the dummy probability distribution class object associated with the probability distribution type of the probability distribution data structure;
the assembling comprises:
assembling the complete distribution class object by replacing the set of variables of the dummy probability distribution class object with the parameters of the distribution tensor, and temporarily storing the complete distribution class object in the memory;
the executing comprises:
executing, by the at least one processor, the one or more methods of the complete distribution class object assembled onto the parameters of the distribution tensor used as variables of the complete distribution class object, and thereafter releasing from the memory the complete distribution class object while keeping only the modified parameters; and
wherein the dummy distribution class object library allows the layers of the neural network to modify the complete distribution class object therein, while only receiving the distribution tensor as an input.

13. The system according to claim 12, wherein each dummy probability distribution class object comprises a set of specific method-APIs that can be executed by the processor to conduct the at least one probability distribution operation on the parameters of the tensor having a corresponding distribution type.

14. The system according to claim 13, wherein the specific method-APIs comprise at least one of: a log likelihood method, a mean method, a variance method, a probability density method, a cumulative distribution method, a survival method, a cross entropy method and a sampling method.

15. The system according to claim 13, wherein:
the data storage further comprises a disassembling function to extract, from the complete distribution class object, the modified distribution tensor, for being able to pass the modified distribution tensor to the downstream layer, the disassembling function thereafter releasing from the memory the complete distribution class object while keeping only the modified parameters, such that only tensors are passed between the layers and are provided as outputs.

16. The system according to claim 15, wherein the assembling and disassembling functions are provided as an assembling-and-disassembling-API.

17. The system according to claim 10, wherein the probability distribution data structures stored on the data storage comprise at least one of: normal, Bernoulli, binomial, uniform, Poisson and exponential distribution data structures.

18. A non-transitory storage memory, storing processor-executable instructions for efficiently processing probability distributions in a neural network using a probabilistic programming language (PPL), the neural network having a plurality of layers, each layer comprising a plurality of nodes, the processor-executable instructions causing one or more processing devices to perform operations including:
  storing, in a data storage, a plurality of probability distribution data structures organized as distribution tensors, and storing corresponding distribution-Application Programming Interfaces (APIs) provided as part of the PPL, each probability distribution data structure of the plurality of probability distribution data structures comprising:
    an identification of a probability distribution type, and
    a list of parameters representative of the probability distribution type;
  calling, by a node of a layer of the neural network, one of the corresponding distribution-APIs to retrieve from the data storage a probability distribution data structure of the plurality of probability distribution data structures needed by one of the layers, based on the identification of the probability distribution type;
  inputting the probability distribution data structure as a distribution tensor into the node of the layer, by storing parameters of the distribution tensor in a memory;
  modifying the distribution tensor within the layer, the node comprising processor-executable instructions causing at least one processor to conduct at least one probability distribution operation on the stored parameters, the at least one probability distribution operation including at least one of sampling and calculating entropy, the processor-executable instructions being written with the PPL, the modifying including:
    accessing a dummy probability distribution class object from a dummy distribution class object library,
    assembling a complete distribution class object by combining the parameters of the distribution tensor with the dummy probability distribution class object,
    executing one or more methods of the complete distribution class object to modify the parameters, and
    extracting the modified parameters from the complete distribution class object into a modified distribution tensor and releasing the complete distribution class object from the memory; and
  outputting, by the node of the layer, the modified distribution tensor to a downstream node of a downstream layer of the layer of the neural network, by referencing the modified parameters in the memory, thereby limiting dataflow in between the layers of the neural network.

19. The non-transitory storage memory according to claim 18, the operations further comprising:
  storing, in the data storage, a distribution library comprising a plurality of distribution functions for modifying the distribution tensors,
  each function comprising specific processor-executable instructions for conducting a given probability distribution operation on respective parameters of a corresponding distribution tensor.

20. The non-transitory storage memory according to claim 19, wherein:
  the PPL is an object-oriented language;
  the distribution library is the dummy distribution class object library comprising a plurality of dummy probability distribution class objects, each dummy distribution class object comprising:
    a set of variables set to zero or having a null value, and
    a set of methods corresponding to the distribution functions,
  the accessing comprises:
    calling the dummy probability distribution class object associated with the probability distribution type of the probability distribution data structure;
  the assembling comprises:
    assembling the complete distribution class object by replacing the set of variables of the dummy probability distribution class object with the parameters of the distribution tensor, and temporarily storing the complete distribution class object in the memory;
  the executing comprises:
    executing, by the at least one processor, the one or more methods of the complete distribution class object assembled onto the parameters of the distribution tensor used as variables of the complete distribution class object, and thereafter releasing from the memory the complete distribution class object while keeping only the modified parameters; and
  wherein the dummy distribution class object library allows the layers of the neural network to modify the complete distribution class object therein, while only receiving the distribution tensor as an input.

* * * * *